Feb. 17, 1970     K. L. HENDERSON     3,495,516

APPARATUS FOR PHOTOGRAPHING MODELS

Filed July 25, 1967

INVENTOR
KENNETH L. HENDERSON
BY
ATTORNEYS

3,495,516
APPARATUS FOR PHOTOGRAPHING MODELS

Kenneth L. Henderson, Ames, Iowa, assignor to Iowa State University Research Foundation, Ames, Iowa, a corporation of Iowa
Filed July 25, 1967, Ser. No. 655,948
Int. Cl. G03b 29/00, 17/56
U.S. Cl. 95—12             12 Claims

ABSTRACT OF THE DISCLOSURE

An apparatus for photographing models including a supporting means for supporting the model to be photographed. An arcuate support arm extends upwardly and over the supporting means and has a light means movably mounted thereon to permit the angle of light directed at the supporting means to be varied. A camera is adjustably secured to the supporting means to permit the relative position of the camera to be varied.

---

It is difficult for an architect to present a model of his work to a client in a manner which will best display the design. The usual photograph of a model fails to give a realistic impression of the architect's design due to the improper lighting of the model and improper camera position. Hence, the client may not be favorably impressed with the proposed design inasmuch as the photograph of the model does not give the client a proper visual impression thereof.

Therefore, it is a principal object of this invention to provide an apparatus for photographing models which produces a photograph wherein the various features of a house as viewed by a person on the edge of the premises will be duplicated therein.

A further object of this invention is to provide an apparatus for photographing models wherein a light means is selectively movable with respect to the model to duplicate the sun's rays for any time of the day.

A further object of this invention is to provide an apparatus for photographing models including a camera means which is movable with respect to the model so that the photograph will closely approximate the angles which would be subtended by the model when the photograph is viewed at reading distance.

A further object of this invention is to provide an apparatus for photographing models wherein an adjustable light source is provided to duplicate the sun's rays for any given time during any season and at any geographical latitude.

A further object of this invention is to provide an apparatus for photographing models including a vertically movable camera means to permit the camera to photograph the model at scale eye-level heights corresponding to the scales of various models to be photographed.

A further object of this invention is to provide an apparatus for photographing models which produces a photograph thereof which is an accurate representation of a proposed design as it would appear to a person viewing the building from the edge of the premises for any given time, season or geographic latitude.

A further object of this invention is to provide an apparatus for photographing models which is economical of manufacture, durable in use and refined in appearance.

These and other objects will be apparent to those skilled in the art.

Figure 1:
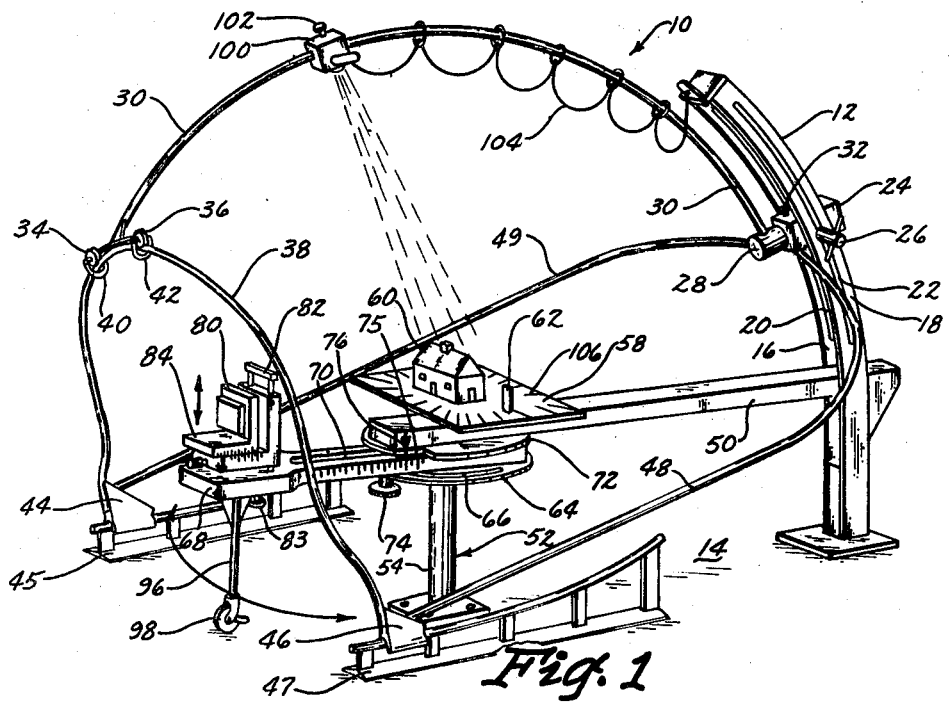
Figure 2:
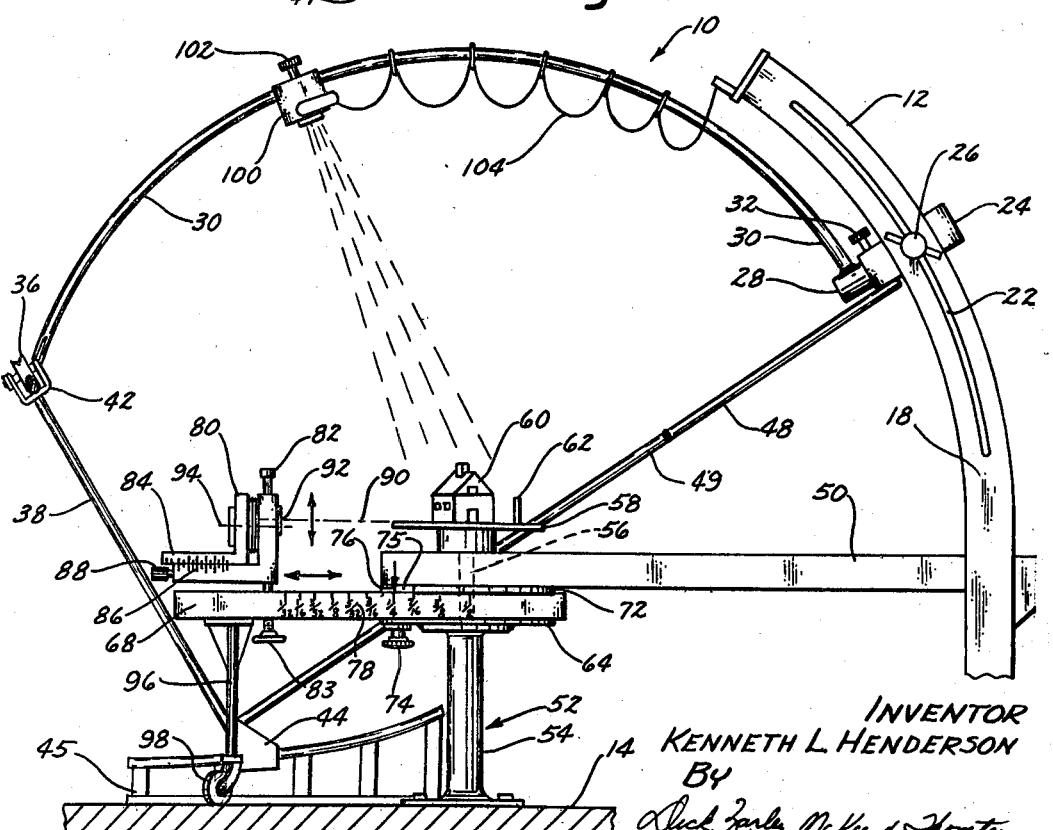

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a perspective view of the apparatus; and
FIG. 2 is a side view of the apparatus.

The apparatus of this invention may be referred to as a photoheliogon and is generally designated by the reference numeral 10. Photoheliogon 10 includes an arcuate stanchion 12 having its lower end engaging a supporting surface 14. Stanchion 12 includes a pair of spaced apart sides 16 and 18 having slots 20 and 22 formed therein respectively. A hub means 24 is mounted between sides 16 and 18 and has a locking means 26 positioned at each side thereof which extends through the slots 20 and 22 to permit the selective positioning of hub means 24 with respect to stanchion 12. Hub means 24 has a rotatable hub element 28 extending therefrom to which is secured the inner end of an arc 30. A locking screw 32 threadably extends through hub means 24 to engage hub element 28 to lock hub element 28 in various positions of its rotatable movement with respect to hub means 24. The outer end of arc 30 is provided with a pair of pulleys 34 and 36 which are movably mounted on an arc 38. As seen in FIG. 1, pulleys 34 and 36 are prevented from disengaging from arc 38 by means of straps 40 and 42 which extend around arc 38. Arc 38 has a pair of guides 44 and 46 secured to its lower free ends as best seen in FIG. 1. If desired, guides 44 and 46 can include casters or the like. Guides 44 and 46 are adapted to movably engage curved supporting tracks 45 and 47 respectively whose center of curvature (viewing as in FIG. 2 normally to the plane of the curvature of stanchion 12) would be identical with the center of the curvature of stanchion 12. As seen in the drawings, the lower ends of arc 38 are splayed outwardly to permit the camera to be moved to various positions with respect to the model to be photographed. A brace 48 is secured at one of its ends to one of the leg portions of arc 38 and extends therefrom and is secured at its other end to hub means 24 by any suitable means. Likewise, a brace 49 is secured at one of its ends to the other leg portion of arc 38 and extends therefrom and is secured at its other end to hub means 24 by any convenient means. As seen in FIG. 1, braces 48 and 49 are also splayed to permit the camera to be moved to various positions with respect to the model to be photographed. The entire apparatus is designed so that the camera can be pivotally moved to any desired angular position with respect to the model and to be moved towards or away from the same to the desired position.

The numeral 50 designates a horizontal beam which is secured at one of its ends to stanchion 12 by any convenient means and is secured adjacent its other end to the upper end of a spindle 52 which is secured to the supporting surface 14. Spindle 52 includes a base portion 54 and a post member 56 extending upwardly therefrom which is secured to beam 50. A plane table 58 is secured to beam 50 above post 56 and supports the model 60 which is to be photographed. Obviously, beam 50 can be omitted providing the center on the plane table 58 is maintained. An eye-level scale 62 is also secured to plane table 58 and extends upwardly therefrom as best seen in the drawings. A disk 64 is secured to the upper end of base 54 and has an arcuate groove 66 formed therein. A link 68 is positioned above disk 64 and is provided with an elongated slot 70 through which post 56 of spindle 52 extends. A disk 72 is positioned between link 68 and beam 50 in a suitable manner so as to permit rotation thereof with link 68. A locking hand wheel 74 extends upwardly through slot 66 in disk 64 and is threadably received by a clamp to lock link 68 in various positions of its slidable movement with respect to post 56 and to also lock link 68 in various positions of its rotatable movement with respect to disk 64. Disk 72 is provided with a cut away portion 75 having an index 76 provided thereon which will be parallel with link 68 at all times during its rotation thereof with respect to disk 64. As seen in FIG. 2, link 68 is provided with a series of indices provided thereon which are generally designated by the reference numeral 78 and are provided so that the operator can align the same with index 76 to achieve the desired camera-object distance.

A camera 80 is movably mounted at one end of link 68 as seen in FIGS. 1 and 2. Camera 80 is vertically movable on a support 82 extending therethrough and secured to link 68. Camera 80 is locked in various positions of its vertical movement with respect to support 82 by means of a locking hand wheel 83 which threadably extends through link 68 and is rotatably secured to the lower end of camera 80. Camera 80 is provided with focusing scales 84 and 86 which will be aligned by means of hand wheel 88. Scales 84 and 86 are actually match lines which are marked for the scale of the model, for example, the ¼ index on scale 84 would be aligned with the ¼ index on scale 86 if the model has been constructed at a scale of ¼"=12". It should also be noted that the axis 90 of the lens 92 is slightly above the axis 94 of the film in the camera. A leg member 96 is secured to link 68 and extends downwardly therefrom as best seen in FIG. 2 and has a caster wheel 98 secured to the lower end thereof.

A light 100 is movably mounted on arc 30 and is locked in various positions of its movement with respect to arc 30 by means of a lock means 102. Light 100 is connected to a source of power by means of lead 104. Arc 30 is designed so that the center thereof is at the precise center of the plane table 58. Likewise, the curvature of stanchion 12 is such that its center of curvature would also be at the exact center of the plane table 58. Also, an axis projected from hub means 24 would also intersect the plane table 58 at the center thereof.

The normal method of operation is as follows: The model 60 which is to be photographed would be placed on the plane table 58 so that its center was positioned exactly over the center of the plane table and also that it is oriented so that its "north" points to stanchion 12. Arc 30 is provided with a series of graduations along the length thereof which would represent various seasons of the year and light 100 would be aligned with the desired seasonal graduation and locked in place by means of lock means 102. Likewise, arc 38 is also provided with a series of graduations provided thereon which would indicate various hours of the day and arc 30 is rotated about hub means 24 until arc 30 is aligned with the proper graduation on arc 38 and lock means 32 would then be secured to maintain arc 38 in this position. The camera may be walked around the model 60 until the desired view is achieved and this movement is possible due to the caster wheel 98 provided on link 68. Assuming that the model to be photographed is constructed to a scale of ¼"=12", the ¼ index on scale 78 would be aligned with index 76 and locking hand wheel 74 would then be tightened to maintain this relationship between link 68 and disk 72. The focusing scales on the camera 80 would also be aligned so that the ¼ index on scale 84 and 86 are aligned and the camera would be locked in this position by means of lock means 88. Camera 80 is then vertically moved to bring the optical axis of the lens 90 to the scale height of a man. The focusing screen of the camera 80 is provided with a mark thereon placed opposite the axis of the lens, which would be aligned with the image of the eye-level scale line marked ¼ which would appear on the scale eye-level gauge 62. Lens 92 on camera 80 is positioned on the camera 80 to cause its axis to intercept the focal plane somewhat above the center of the sensitive film or plate, which has been designated by the reference numeral 94, on which an image is to be recorded, this above-center position being for the purpose of reducing the proportion of the foreground to be recorded and correspondingly increasing the proportion allotted to the structure of the model 60. Plane table 58 is also provided with a plurality of graduations 106 thereon for the purpose of assisting in the location of the model in azimuth, the longitudinal direction of beam 50 lying in a "north" and "south" direction in the configuration of the whole structure; for normal adjustments of the structure "north" would lie in the direction from plane table 58 to hub means 24, yet for special circumstances this order may be reversed if warranted. In the southern hemisphere, the hub 24 would be "south" for the model.

Thus, an apparatus has been provided which permits a model of a design to be photographed in light simulating any given time of the day, season and geographical latitude. The photograph would illustrate the design as viewed from the edge of the premises and from the eye-level of the person viewing the same. The apparatus permits the model to be photographed from various angles and will give an accurate picture of the design as it would appear during various times of the day and seasons which will more accurately reflect the architect's design. Without photographing, the models may be observed under any conditions of lighting to determine if corrections to the model are desirable. Thus it can be seen that the apparatus accomplishes at least all of its stated objectives.

Some changes may be made in the construction and arrangement of my Apparatus for Photographing Models without departing from the real spirit and purpose of my invention, and it is my intention to cover by my claims, any modified forms of structure or use of mechanical equivalents which may be reasonably included within their scope.

I claim:

1. An an apparatus for photographing models comprising:
   a supporting means for supporting the model to be photographed,
   an arcuate support arm extending upwardly and over said supporting means,
   a light means selectively movably mounted on said support arm to vary the angle of light directed at said supporting means,
   and a camera means operatively adjustably secured to said supporting means whereby the position of the camera with respect to a given position on the supporting means can be selectively adjusted,
   the center of curvature of said support arm intersecting said supporting means at the center thereof.

2. The apparatus of claim 1 wherein said camera means is vertically movable with respect to said supporting means.

3. The apparatus of claim 1 wherein said camera means is movable towards and away from said supporting means.

4. The apparatus of claim 1 wherein said camera means is rotatable in a horizontal plane about said supporting means.

5. The apparatus of claim 1 wherein said arcuate support arm is selectively movable with respect to said supporting means whereby the angle of light directed at said supporting means may be varied to duplicate a predetermined geographical location, time and season.

6. The apparatus of claim 1 wherein said supporting means includes a plane table adapted to support said model, said plane table including azimuth indices thereon to permit the model to be positioned with respect thereto to properly align said model in the proper direction.

7. In an apparatus for photographing models comprising:
   a supporting means for supporting the model to be photographed, an arcuate support arm extending upwardly and over said supporting means, a light means selectively movably mounted on said support arm to vary the angle of light directed at said supporting means, and a camera means operatively adjustably secured to said supporting means whereby the position of the camera with respect to a given position on the supporting means can be selectively adjusted, said camera means being movable towards and away from said supporting means, said camera means being mounted on a frame means which is selectively movably secured to said supporting means, said supporting means and said frame means having match scales provided thereon which are aligned to produce the proper scale viewing distance for the model.

8. The apparatus of claim 7 wherein said camera means includes focusing scales which are aligned to correspond to the scale of the model being photographed.

9. In an apparatus for photographing models comprising:

a supporting means for supporting the model to be photographed, an arcuate support arm extending upwardly and over said supporting means, a light means selectively movably mounted on said support arm to vary the angle of light directed at said supporting means, and a camera means operatively adjustably secured to said supporting means whereby the position of the camera with respect to a given position on the supporting means can be selectively adjusted, one end of said arcuate support arm being movably secured to an arcuate stanchion means, said stanchion means having its axial intersecting said supporting means at the center thereof.

10. In an apparatus for photographing models comprising:

a supporting means for supporting the model to be photographed, an arcuate support arm extending upwardly and over said supporting means, a light means selectively movably mounted on said support arm to vary the angle of light directed at said supporting means, and a camera means operatively adjustably secured to said supporting means whereby the position of the camera with respect to a given position on the supporting means can be selectively adjusted, said camera means being vertically movable with respect to said supporting means, an eye-level scale means detachably secured to said supporting means and extending upwardly therefrom, said camera means being vertically movable with respect to said scale means so that said camera means will photograph the model at the corresponding eye-level of a person.

11. In an apparatus for photographing model comprising:

a supporting means for supporting the model to be photographed, an arcuate support arm extending upwardly and over said supporting means, a light means selectively movably mounted on said support arm to vary the angle of light directed at said supporting means, and a camera means operatively adjustably secured to said supporting means whereby the position of the camera with respect to a given position on the supporting means can be selectively adjusted, said camera means being vertically movable with respect to said supporting means, said camera means including means for adjusting and fixing its optical lens axis with respect to its film axis so that the optical lens axis may be positioned above the film axis to reduce the proportion of the foreground to be photographed.

12. In an apparatus for photographing models comprising:

a supporting means for supporting the model to be photographed, an arcuate support arm extending upwardly and over said supporting means, a light means selectively movably mounted on said support arm to vary the angle of light directed at said supporting means, and a camera means operatively adjustably secured to said supporting means whereby the position of the camera with respect to a given position on the supporting means can be selectively adjusted, said arcuate support arm being selectively movable with respect to said supporting means whereby the angle of light directed at said supporting means may be varied to duplicate a predetermined geographical location, time and season, the other end of said support arm being movably mounted on a second arcuate support arm.

References Cited

UNITED STATES PATENTS

| | | | |
|---|---|---|---|
| 2,474,055 | 6/1949 | Lacey | 240—1.3 |
| 2,882,790 | 4/1959 | Broms | 95—86 X |
| 3,258,585 | 6/1966 | Crete | 240—1.3 |
| 3,378,678 | 4/1968 | De Groff | 240—1.3 |

NORTON ANSHER, Primary Examiner

W. A. SIVERTSON, Assistant Examiner

U.S. Cl. X.R.

240—1.3; 95—86